United States Patent
Lammlein, Jr. et al.

(10) Patent No.: US 6,401,783 B1
(45) Date of Patent: Jun. 11, 2002

(54) TWO DRUM TURRET FOR TIRE BUILDING

(75) Inventors: Robert Albert Lammlein, Jr., Cuyahoga Falls; James Michael Hart, Akron, both of OH (US)

(73) Assignee: The Goodyear Tire & Rubber Company, Akron, OH (US)

(*) Notice: Subject to any disclaimer, the term of this patent is extended or adjusted under 35 U.S.C. 154(b) by 0 days.

(21) Appl. No.: 09/547,518

(22) Filed: Apr. 12, 2000

(51) Int. Cl.[7] .............................................. B29D 30/24

(52) U.S. Cl. ...................... 156/396; 156/111; 156/414

(58) Field of Search .............................. 156/396, 394.1, 156/406.2, 414, 111, 130; 384/557, 493, 905

(56) References Cited

U.S. PATENT DOCUMENTS

| | | | | |
|---|---|---|---|---|
| 4,398,774 A | * | 8/1983 | Voll et al. .................... | 384/493 |
| 5,399,225 A | | 3/1995 | Miyamoto et al. .......... | 156/396 |
| 5,509,789 A | * | 4/1996 | Segebrecht et al. ........... | 417/68 |
| 5,540,803 A | | 7/1996 | Miyamoto et al. .......... | 156/396 |
| 5,730,829 A | * | 3/1998 | Conger et al. .............. | 156/396 |
| 5,975,764 A | * | 11/1999 | Okada et al. ............... | 384/476 |

FOREIGN PATENT DOCUMENTS

SU            682389         8/1979

* cited by examiner

Primary Examiner—Geoffrey L. Knable
(74) Attorney, Agent, or Firm—Frederick K. Lacher; Bruce J. Hendricks

(57) ABSTRACT

A tire drum turret having an outboard support and direct drive of the frame with adjustable drum shaft bearings for precise positioning of the drums.

11 Claims, 4 Drawing Sheets

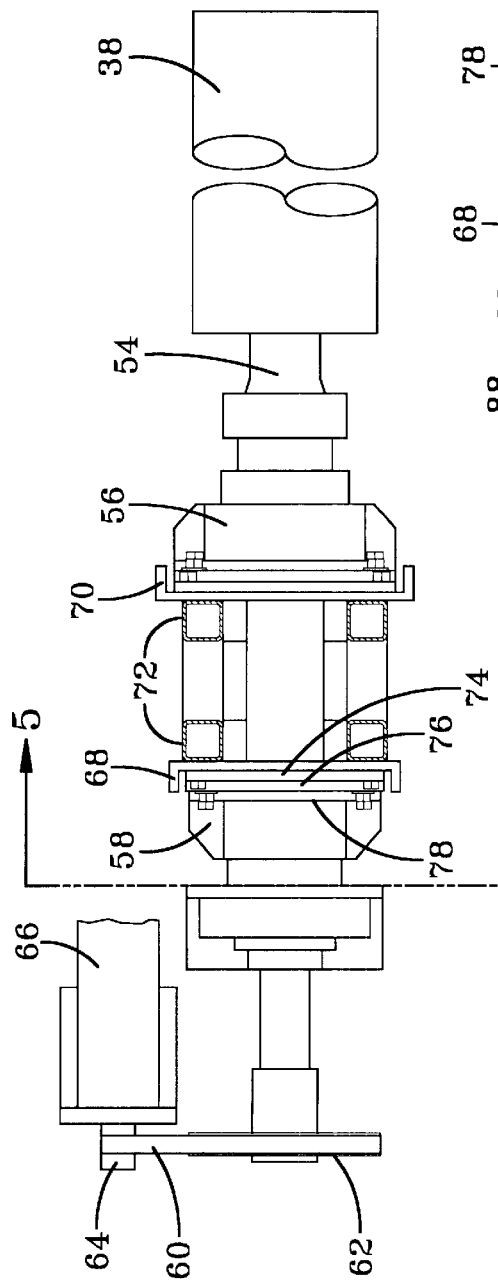
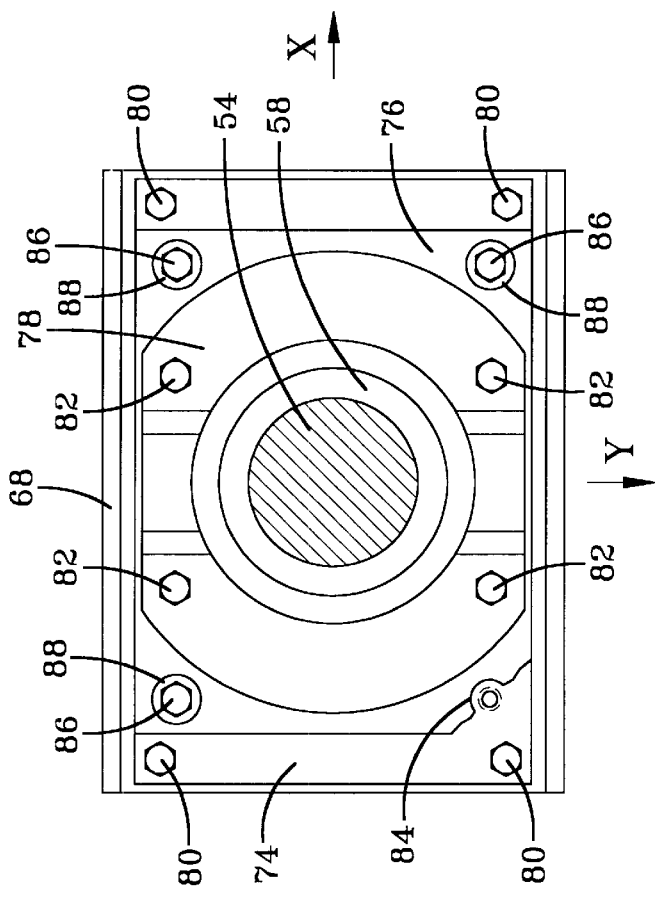
FIG-4
FIG-5

TWO DRUM TURRET FOR TIRE BUILDING

TECHNICAL FIELD

This invention relates to tire building machines and especially to turrets having two drums for the assembly of tire components with the drums in more than one position. It is especially relevant to tire building machines for building relatively heavy tires, such as truck tires for highway use where precision building is important for safety and performance.

BACKGROUND OF THE INVENTION

Heretofore, as shown in U.S. Pat. No. 5,730,829, a two drum turret for tire assembly has been provided with a pair of drums mounted on a turret which is rotatable on a turret drive shaft. The turret is rotated on the turret drive shaft 180 degrees for interchanging the positions of the drums and adding different tire components. This arrangement has been satisfactory for building passenger tires, however, with larger truck tires, there may be problems building a tire with precision because the increased weight of the larger size drums and the weight of the truck tires make it difficult to maintain alignment of the drum spindles. Also, the twisting of the turret drive shaft due to driving the shaft at a distance from the turret makes it difficult to move the heavier drums and tire assemblies into predetermined positions for application of the tire components. Provision of an outboard support for the turret drive shaft has been proposed for a turret in Russian patent SU682-389, however, no provision for controlling the rotation of the turret with precision is provided.

SUMMARY OF THE INVENTION

In accordance with the present invention, a tire building turret and turret rotating apparatus is provided which not only has an outboard support but is provided with a direct drive to eliminate twisting of the drive shaft rotating the turret so that precise positioning of the drum is obtained. Also, the drum shafts are mounted in the rotatable turret frame to permit elongation of the drum shafts with a minimum of axial movement of the drums relative to the frame. Adjustable drum shaft bearings are provided to position the axles in the rotatable turret frame to further insure the building of tires with precision on the drum.

In accordance with one aspect of the invention, there is provided a tire building apparatus comprising a turret support housing, a turret frame rotatably mounted on the housing, a first drum rotatably mounted on the turret frame at one side of the frame, a second drum rotatably mounted on the turret at an opposite side of the frame, characterized by power means mounted on the housing and in direct driving engagement with the turret frame for rotating the turret frame directly from the turret support housing to position the first drum and the second drum in predetermined positions for application of tire components.

In accordance with another aspect of the invention, there is provided a tire building apparatus comprising a turret frame mounted for rotation on a turret support shaft and having a first drum rotatably mounted on a first shaft supported in spaced apart first and second bearings and a second drum rotatably mounted on the second shaft supported in the housing for rotation on third and fourth bearings characterized by the spaced apart first bearing being a fixed bearing adjacent the first drum and the second bearing being spaced from the first bearing and being movable to maintain a substantially fixed axial position of the first drum while permitting elongation of the first shaft and the third bearing being a fixed bearing adjacent the second drum and the fourth bearing being spaced from the third bearing and being movable axially to maintain a substantially fixed axial position of the second drum while permitting elongation of the second shaft.

BRIEF DESCRIPTION OF DRAWINGS

FIG. 4 is an enlarged sectional view like FIG. 3 of one of the drum bearing supports.

FIG. 5 is an enlarged sectional view of the bearing adjustments taken along the line 5—5 in FIG. 4.

DETAILED DESCRIPTION OF THE INVENTION

Figure 1:
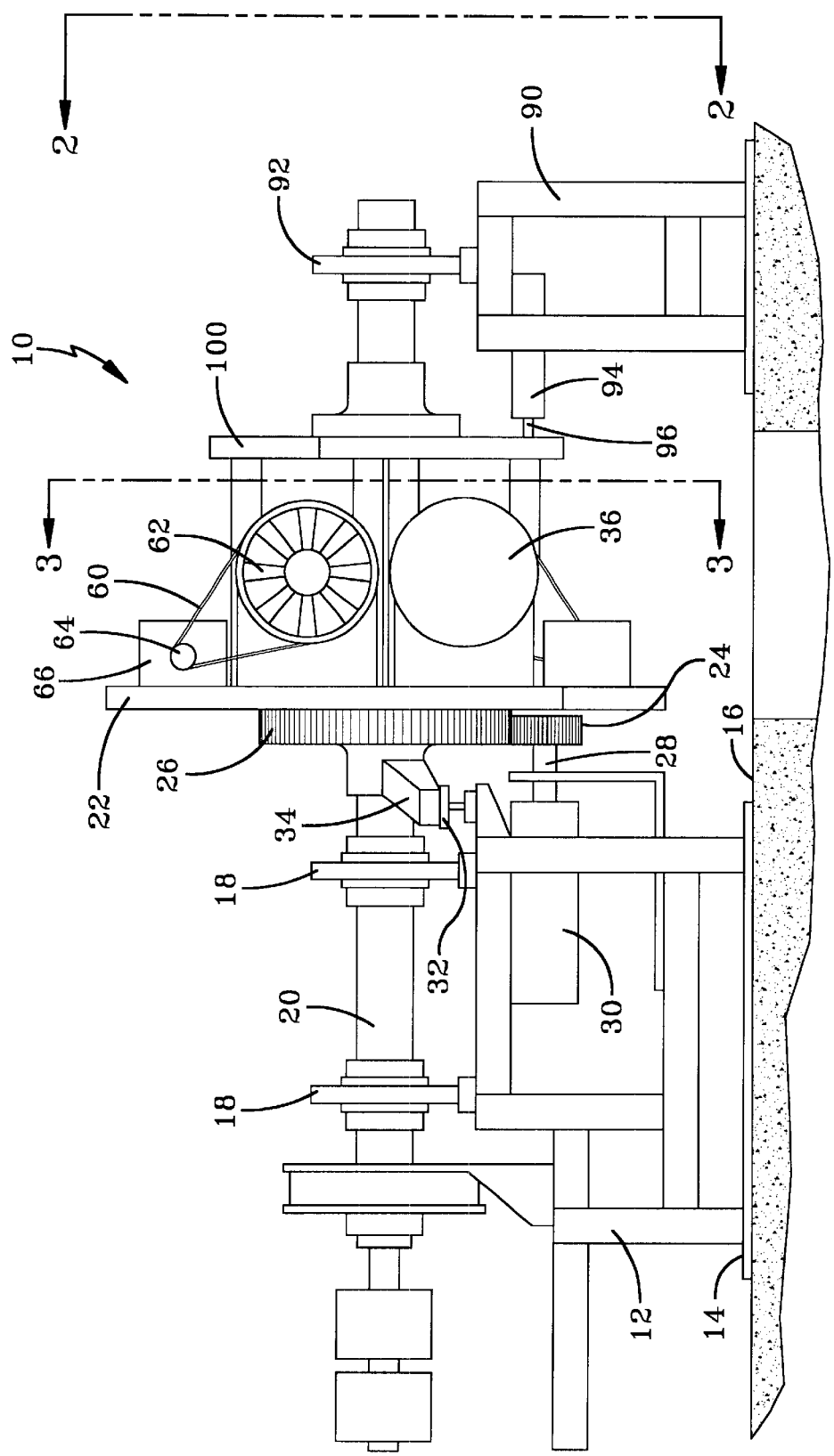
FIG. 1 is a side elevation of a two drum turret embodying the invention.
Figure 2:
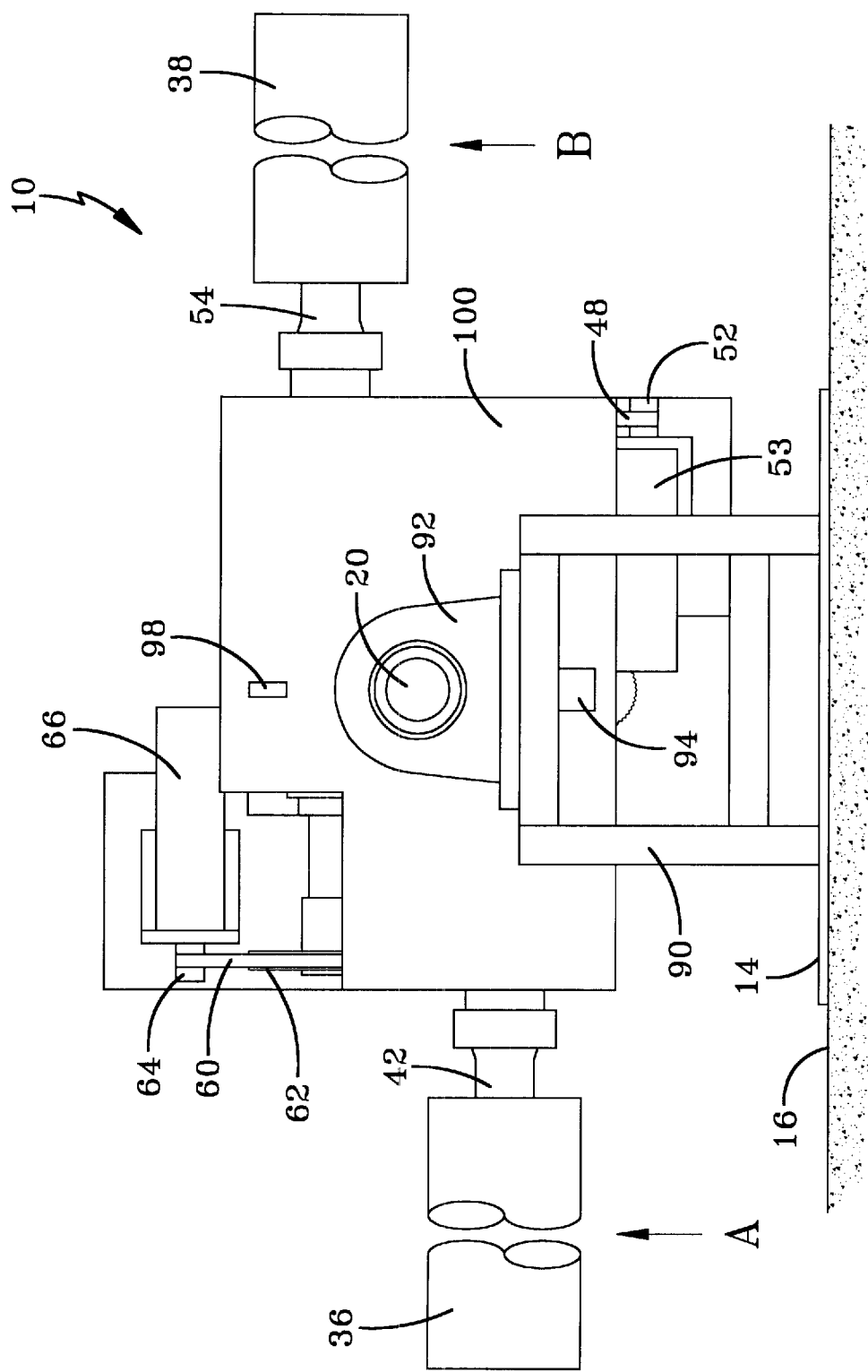
FIG. 2 is an end view of the turret taken along line 2—2 in FIG. 1.

Referring to FIGS. 1 and 2, a tire building machine 10 is shown having a turret support housing 12 mounted on a base plate 14 supported on a floor surface 16. The housing 12 has spaced apart bearings 18 supporting a turret shaft 20. A turret frame 22 is mounted on one end of the turret shaft 20 and is rotated by a pinion drive gear 24 in engagement with a circular gear rack 26 mounted on the turret frame 22. The pinion drive gear 24 is driven by a shaft 28 of a power means such as a motor 30 mounted on the turret support housing 12. This provides direct drive of the turret frame 22 without applying torque to the turret shaft 20 and thereby avoids twisting of the shaft.

Stop members 32 mounted on each side of the turret support housing 12 are engageable by a motion limiting arm 34 and may include shock absorbers for cushioning the turret frame 22 as it is rotated from one side to the other.

Figure 3:
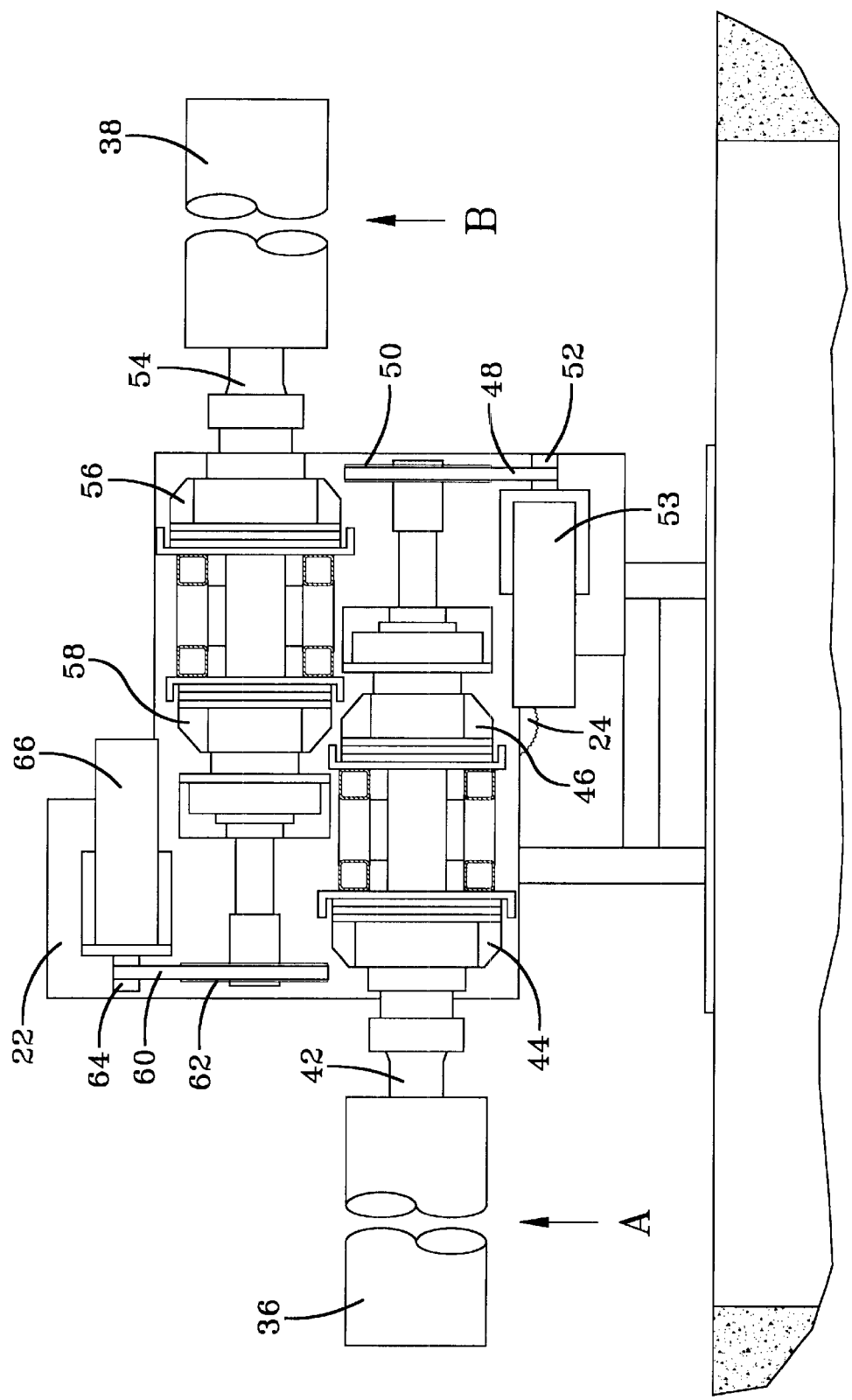
FIG. 3 is a sectional view taken along the line 3—3 in FIG. 1.

Referring to FIG. 3, the turret frame 22 is shown in a first position with a first drum 36 in a position A and a second drum 38 in a position B. The first drum 36 is mounted on a first shaft 42 supported in a first bearing 44 and a spaced apart second bearing 46 and is driven by a belt 48 extending around a pulley 50 mounted on the shaft 42 and around a drive shaft 52 of a motor 53 mounted on the turret frame 22. The second drum 38 is mounted on a second shaft 54 supported by a third bearing 56 and a fourth bearing 58 mounted on the turret frame 22. A drive belt 60 extends around a pulley 62 mounted on the second shaft 64 and around a drive shaft 54 of a motor 66 mounted on the turret frame 22 for rotating the second drum 38.

During operation, the first shaft 42 and second shaft 54 may expand and elongate or retract and change in length due to changes in temperature. The first bearing 44 and third bearing 56 are mounted on the shafts to prevent actual movement of the drums 36 and 38. The expansion or elongation of the shafts 42 and 54 is accommodated by the second bearing, 46 and fourth bearing 58 which permit axial movement of the shafts during operation.

Referring to FIGS. 4 and 5, the mounting of the second shaft 54 on the turret frame 22 is shown in greater detail. The mounting of the first shaft 42 is identical with the mounting of the second shaft 54.

As shown in FIG. 4, the third bearing 56 and fourth bearing 58 are supported on rigid turret frame plates 68 and 70 fastened to tubular frame members 72. In order to permit radial adjustment of the shaft 54 an attachment plate 74 and an adjustment plate 76 are mounted between the frame plate 68 and a flange 78 of the bearing 58. The attachment plate 74 is fastened to the frame plate 68 by screws 80. The flange 78 of the bearing 58 is fastened to the adjustment plate 76 by screws 82. The adjustment plate 74 has enlarged holes 84 through which screws 86 and washers 88 clamp the adjustment plate against the attachment plate 74 in such a manner that adjustments of the bearing 58 in an X and Y direction such as shown in FIG. 5 may be made. This provides the desired alignment of the shaft 54 for precise positioning of the drum 38. A similar adjustment of the bearing 58 is also provided to precisely align the drum 38. The bearings 44 and 46 are mounted in a similar manner to precisely align the shaft 42 and first drum 36 as shown in FIG. 3.

Referring to FIGS. 1 and 2, the outboard turret support housing 90 is shown having a pillow block 92 containing a bearing for rotatably supporting the outboard end of the shaft 20. Lock means, such as a pneumatic actuated lock bar 94 is mounted on the outboard turret support housing 90 and has a pin 96 movable into engagement with slots 98 in an outboard In operation the turret frame 22 is moved to the locked position shown in FIGS. 1 and 2 with the first drum 36 in the first position A and the second drum 38 in the second position B as shown in FIGS. 1 and 2. The pneumatic actuation lock 94 is actuated to move the pin 96 into one of the slots 98 in the outboard plate 100. In moving the turret frame 22 to this position, the motor 30 is actuated rotating the pinion 24 and driving the gear rack 26 to a position where the motion limiting arm engages stop member 32. As shown in FIGS. 4 and 5, the first shaft 42 and the second shaft 54 for the drums 36 and 38 may be moved into alignment by loosening the screws 86 and moving the adjustment plate 76 to obtain the exact alignment. Then the screws 86 may be tightened. The first drum 36 is rotated by actuating the motor 53 and tire components applied to the drum. After the tire components are applied the pin 96 of the pneumatic actuator lock bar is retracted and the motor 30 actuated to rotate the pinion 24 causing the shaft 20 to rotate to a position where the motion limiting arm 34 engages a stop member 32 at the opposite side of the housing 12. The pin 96 is then moved into the slot 98 in the outboard plate 100 to hold the turret frame in the new position with the first drum 36 in position B and the second drum 38 in position A. The first drum 36 is then rotated while additional tire components are placed over the tire components applied in position A. Meanwhile, tire components may be applied to the second drum 38 in position A.

During the rotation of the turret frame 22, the shaft 20 is not subject to torsion providing a more accurate placement of the first drum 36 and second drum 38. Also, the drums 36 and 38 on the first shaft 42 and second shaft 54 are maintained in the same relative axial positions because the bearings 56 and 44 are held in fixed axial positions. The bearings 46 and 58 do permit axial movement to compensate for the elongation of the shafts during operation.

While a certain representative embodiment and details have been shown for the purpose of illustrating the invention, it will be apparent to those skilled in the art that various changes and modifications may be made therein without departing from the scope of the invention.

What is claimed is:

1. A tire building apparatus comprising a turret support housing, a shaft rotatably supported on said housing, a turret frame mounted on said shaft, a first drum rotatably mounted on said turret frame at one side of said frame, a second drum rotatably mounted on said turret frame at an opposite side of said frame, characterized by power means mounted on said housing and in direct driving engagement with said turret frame for rotating said turret frame directly from said turret support housing to position said first drum and said second drum in predetermined positions for application of tire components.

2. A tire building apparatus in accordance with claim 1 further characterized by said power means comprising a pinion drive gear and said turret frame having a gear rack in engagement with said pinion drive gear.

3. A tire building apparatus in accordance with claim 2 further characterized by said shaft being supported on spaced-apart bearings mounted on said housing and said gear rack being mounted on said turret frame at a position extending around said shaft.

4. A tire building apparatus in accordance with claim 3 further characterized by said gear rack comprising gear teeth on the outer periphery of a circular plate mounted on said shaft and said circular plate being fastened to said turret frame for supporting and rotating said turret frame.

5. A tire building apparatus in accordance with claim 3 further characterized by spaced apart stop members on said turret frame engageable with stop surfaces on said housing to limit the rotation of said turret frame.

6. A tire building apparatus in accordance with claim 5 further characterized by said stop members including shock absorbers positioned for cushioning the stopping of said turret rotation with said stop members.

7. A tire building apparatus in accordance with claim 3 further characterized by an outboard turret support housing positioned at an opposite side of said turret frame from said turret support housing and said turret frame being rotatably supported on said outboard turret support housing.

8. A tire building apparatus in accordance with claim 7 further characterized by said outboard turret support housing having lock means for engaging said turret frame at predetermined positions for locating said first drum and said second drum in predetermined positions for application of tire components.

9. A tire building apparatus in accordance with claim 8 further characterized by said lock means comprising a pneumatic actuated lock bar on said outboard turret support movable into engagement with slots in said turret frame located at said predetermined positions for application of tire components.

10. A tire building apparatus in accordance with claim 1 further characterized by said turret frame having said first drum rotatably mounted on a first shaft supported in spaced apart first and second bearings and said second drum rotatably mounted on a second shaft supported in said housing for rotation on third and fourth bearings characterized by said first bearing being a fixed bearing adjacent said first drum, and said second bearing being spaced from said first bearing and being movable to maintain a substantially fixed axial position of said first drum while permitting elongation of said first shaft, said third bearing being a fixed bearing adjacent said second drum and said fourth bearing being spaced from said third bearing and being movable axially to maintain a substantially fixed axial position of said second drum while permitting elongation of said second shaft.

11. A tire building apparatus of claim 10 further characterized by said turret frame having rigid frame members forming a framework rotatable on said turret support shaft characterized by frame plate members mounted on said framework having openings for said first shaft and said second shaft and adjustable plate members bolted through enlarged holes in said frame plate member for adjustment attached to said first bearing, said second bearing, said third bearing and said fourth bearing with each of said adjustable plate members being adjustably attached to one of said frame plate members for movement radially of said first shaft and said second shaft to permit precise alignment of said first shaft and said second shaft.

* * * * *